US012242897B2

(12) United States Patent
Palukuri et al.

(10) Patent No.: US 12,242,897 B2
(45) Date of Patent: Mar. 4, 2025

(54) KEY-BASED AGGREGATION SERVICE

(71) Applicant: Oracle International Corporation, Redwood Shores, CA (US)

(72) Inventors: Kiran Kumar Palukuri, Bangalore (IN); Pankaj Agrawal, Hyderabad (IN); Naga Raju Barri, Telangana (IN); Jerry Paul Russell, Seattle, WA (US); Satinder Singh, Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 18/061,013

(22) Filed: Dec. 2, 2022

(65) Prior Publication Data

US 2023/0297436 A1  Sep. 21, 2023

Related U.S. Application Data

(63) Continuation-in-part of application No. 17/885,169, filed on Aug. 10, 2022.

(60) Provisional application No. 63/402,794, filed on Aug. 31, 2022, provisional application No. 63/322,112, filed on Mar. 21, 2022.

(51) Int. Cl.
*G06F 9/50* (2006.01)
*H04L 9/08* (2006.01)

(52) U.S. Cl.
CPC .............. *G06F 9/5061* (2013.01); *H04L 9/08* (2013.01)

(58) Field of Classification Search
CPC .................. G06F 9/5061; H04L 9/08

USPC ......................................................... 709/201
See application file for complete search history.

(56) References Cited

U.S. PATENT DOCUMENTS

| | | | |
|---|---|---|---|
| 9,563,486 B1 | 2/2017 | Narsude et al. | |
| 10,356,150 B1* | 7/2019 | Meyers | H04L 65/70 |
| 10,735,554 B1* | 8/2020 | Jorgovanovic | H04L 65/612 |
| 11,093,493 B1* | 8/2021 | Krishnaswamy | G06F 16/2453 |
| 2006/0184261 A1* | 8/2006 | Ng | H04J 3/0632 |
| | | | 700/94 |
| 2006/0221836 A1 | 10/2006 | Wang | |
| 2013/0198005 A1 | 8/2013 | Xiong et al. | |

(Continued)

OTHER PUBLICATIONS

"Introduction to Caches", Retrieved from https://docs.oracle.com/cd/E15357_01/coh.360/e15723/cache_intro.htm#COHDG5049, Retrieved on Dec. 5, 2022, 12 Pages.

(Continued)

*Primary Examiner* — David P Zarka
(74) *Attorney, Agent, or Firm* — Invoke

(57) ABSTRACT

Techniques are disclosed for aggregating received data from a data stream. Data is received from a particular stream partition to which a device is subscribed, and subsets of the data, from the particular stream partition, are aggregated based on respective keys associated with the subsets of the data. The device determines whether one or more subsets of data, associated with a particular key, meet at least one processing criteria, such as a threshold amount of data, and refraining from processing the aggregated data when the processing criteria is not met. Once additional subset(s) of data associated with the particular key are received, they are aggregated with the one or more subsets of data. When the processing criteria is satisfied, the device processes the aggregated subsets of data associated with the particular key.

20 Claims, 5 Drawing Sheets

(56) References Cited

U.S. PATENT DOCUMENTS

| | | | |
|---|---|---|---|
| 2015/0135255 A1 | 5/2015 | Theimer et al. | |
| 2016/0110391 A1* | 4/2016 | Korycki | G06F 16/9535 |
| | | | 707/741 |
| 2018/0121254 A1* | 5/2018 | Ghare | G06F 9/5083 |
| 2021/0344781 A1 | 11/2021 | Zhang et al. | |
| 2022/0100726 A1* | 3/2022 | Zhao | G06F 16/2272 |
| 2023/0297592 A1* | 9/2023 | Palukuri | G06F 16/22 |
| | | | 707/737 |

OTHER PUBLICATIONS

"Production Checklist", Coherence Administrator's Guide, Retrieved from https://docs.oracle.com/cd/E24290_01/coh.371/e22838/deploy_checklist.htm#COHAG5095, Retrieved on Dec. 3, 2022, 12 Pages.
Narkhede N., "Exactly-Once Semantics Are Possible: Here's How Kafka Does It", Retrieved from https://www.confluent.io/blog/exactly-once-semantics-are-possible-heres-how-apache-kafka-does-it/, Jun. 30, 2017, 20 Pages.

* cited by examiner

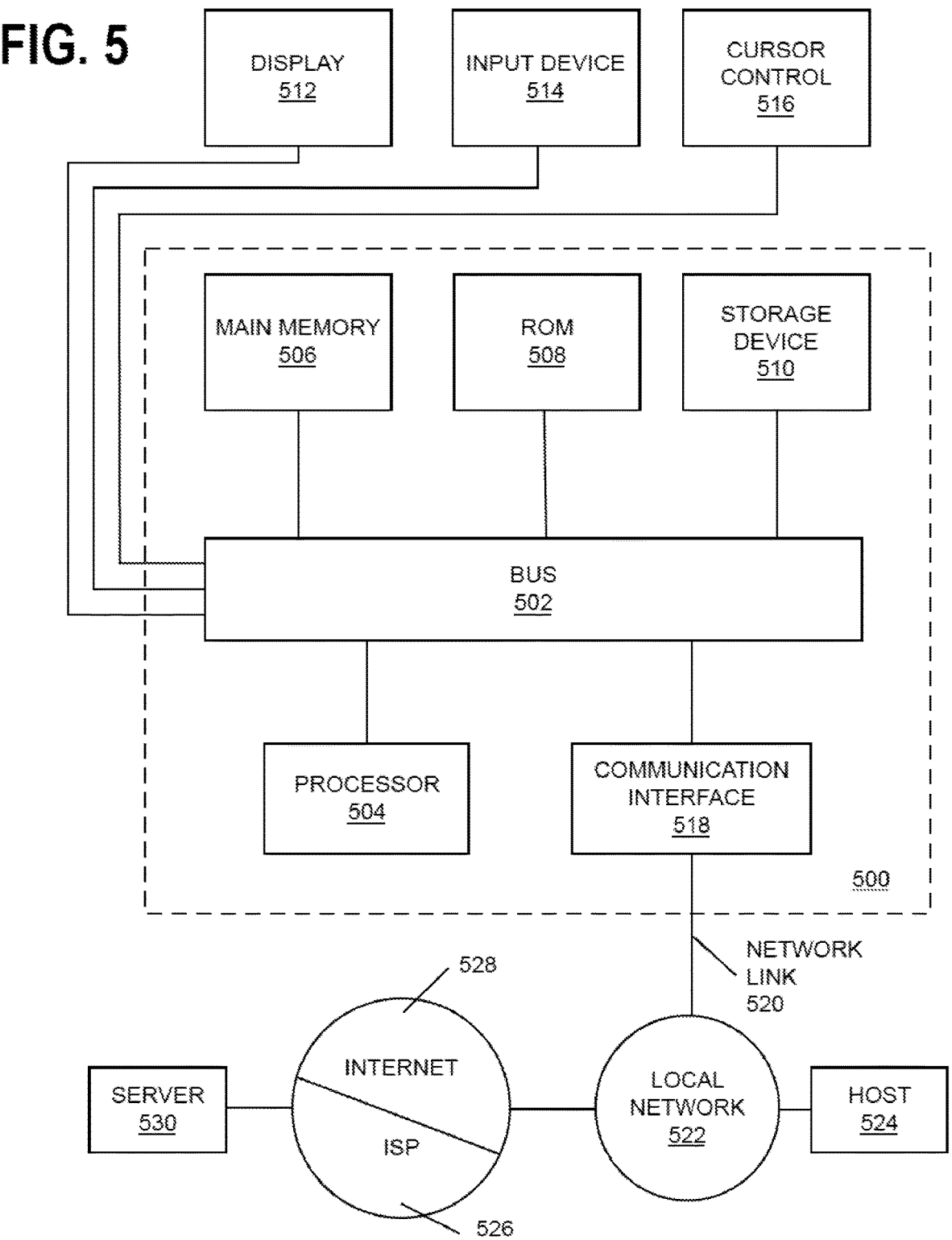

KEY-BASED AGGREGATION SERVICE

INCORPORATION BY REFERENCE; DISCLAIMER

The following applications are hereby incorporated by reference: application Ser. No. 63/402,794 filed on Aug. 31, 2022; application Ser. No. 63/322,112 filed on Mar. 21, 2022; application Ser. No. 17/885,169 filed on Aug. 10, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to key-based aggregation of data received across multiple stream partitions.

BACKGROUND

Collecting and processing data in a data stream is an increasingly common alternative to, or complement to, more traditional database architectures. A data stream may include a series of discrete or interrelated data requests, data inquiries, data blocks, data bundles, data packets, events, etc. In various approaches, the series may include transactions that are time-indexed, sequentially-ordered, periodic, triggered, or randomly issued. Examples of these transactions may include data queries and requests, clickstream data (e.g., webpage requests, webpage renderings, mobile application transactions), changes to variable values (e.g., as collected by sensors like temperature data collected from a smart thermostat, steps taken measured by a pedometer, etc.), and the like.

Some applications or systems generate a vast amount of data (e.g., multiple terabytes of data per day) and transmit this data to a system for storage and/or delivery to some consumer. Sometimes, a data stream may be generated from this data for consumption by one or more processes subscribed to the data stream. Many common types of data that are generated by these applications may be small in size or grouped together in small units (e.g., data bundles, data packets, etc.) that are small in size.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 shows a block diagram that illustrates a computer system in accordance with one or more embodiments.

DETAILED DESCRIPTION

Figure 1:
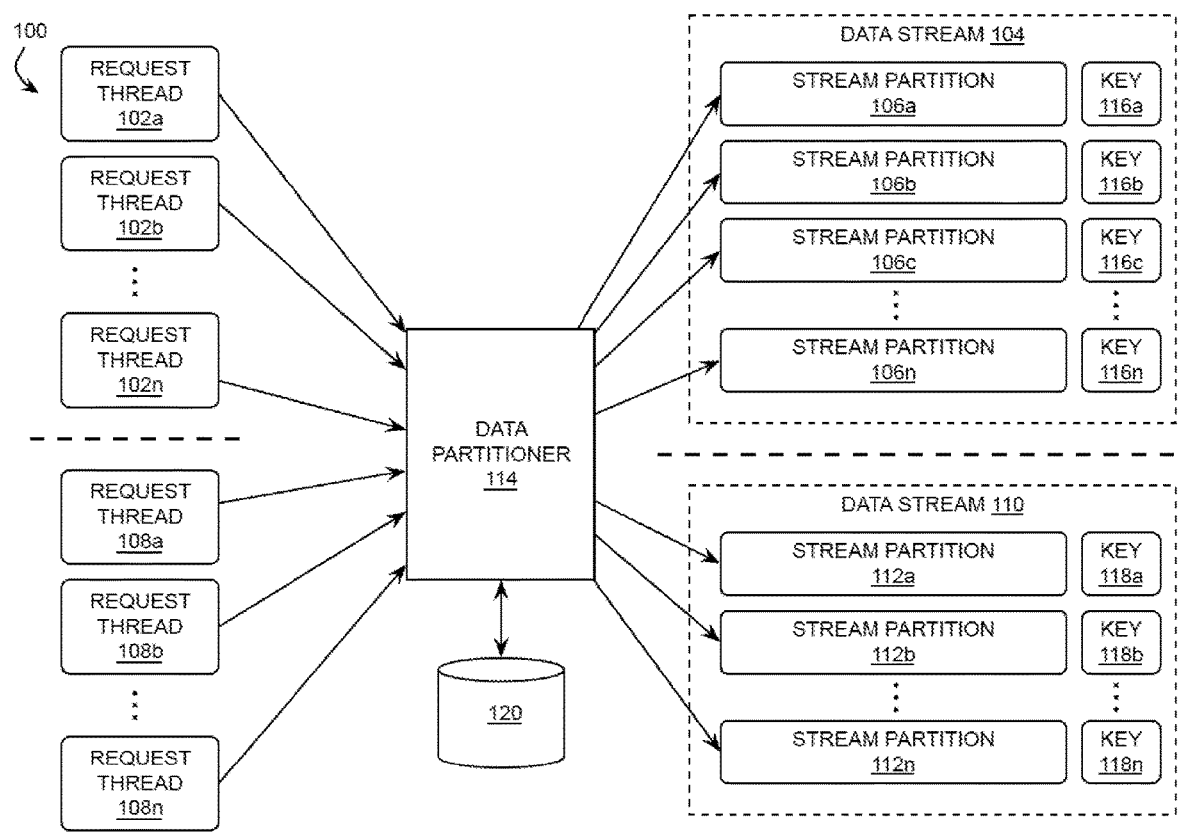
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA STREAM PARTITIONING
4. BATCHING AND BUFFERING
5. HANDLING IDEMPOTENCY
6. DATA INGESTION
7. DATA CONSUMPTION
8. MAINTAINING STATE WITH DISTRIBUTED CACHE
9. EXAMPLE EMBODIMENTS
10. COMPUTER NETWORKS AND CLOUD NETWORKS
11. HARDWARE OVERVIEW
12. MISCELLANEOUS; EXTENSIONS

1. General Overview

A data publisher may transmit data via stream partitions in a data stream. The data publisher may transmit multiple sets of data corresponding to a same key in the same stream partition. In some cases, a stream partition only includes data associated with a single key. In other cases, a stream partition includes data associated with multiple different keys.

In one or more embodiments, a consumer implements key-based aggregation to generate key-specific batches of data, each key-specific batch being processed when an amount of received data in the key-specific batch meets a corresponding batch threshold. Initially, a consumer subscribes to a particular stream partition of the data stream that includes data associated with multiple different keys. The consumer generates key-specific batches by aggregating data associated with the same key into the same batch. The consumer monitors each key-specific batch to detect when the amount of data in any key-specific batch meets a corresponding batch threshold. When the amount of data in a particular key-specific batch meets the corresponding batch threshold, the consumer processes that particular key-specific batch. Alternatively or additionally, when a threshold amount of time has passed since receipt of a first subset of data in a particular key-specific batch, the consumer processes that particular key-specific batch. Alternatively or additionally, the consumer implements any batch-specific processing criteria. When the characteristics of data in a particular key-specific batch meet the corresponding batch-specific processing criteria, the consumer processes that particular key-specific batch. When a new subset of data for the same key is received, a new batch for aggregating the data associated with the key is initiated since the prior batch for the data associated with the key has already been processed.

Key-specific batch processing may result in processing a first subset of data subsequent to processing of a second subset of data even though the first subset of data was received prior to the second subset of data. In this example, the first subset of data is assigned to a first batch and the second subset of data is assigned to a second batch. The characteristics of the data in the second batch meet the corresponding batch-specific processing criteria prior to the characteristics of data in the first batch meeting the corresponding batch-specific processing criteria. As a result, the second batch (with the later-received second subset of data) is processed prior to the first batch (with the earlier received first subset of data).

In an embodiment, processing a particular key-specific batch of data may include applying one or more operations to the data and/or transmitting the data. In some cases, each key-specific batch of data is destined for the same target destination. Accordingly, when the particular key-specific batch of data meets the corresponding batch-specific processing criteria, the data in the particular key-specific batch is transmitted together as a batch to the same destination.

While example embodiments described herein include application of key-based aggregation to subsets of data in a particular stream partition that are respectively associated with different keys, the example embodiments may be applied to subsets of data in a stream that are respectively associated with different keys (without regard to stream partitions).

One or more embodiments described in this Specification and/or recited in the claims may not be included in this General Overview section.

2. Architectural Overview

One or more embodiments described below include systems and methods that aggregate data into a data stream. Data streaming is useful for many applications, such as messaging, metric and log ingestion, web activity data ingestion, mobile activity data ingestion, infrastructure and mobile app event processing, etc.

In any of these example applications, data streaming may be used as an asynchronous message bus that acts independently and at its own pace to decouple components of large systems. Data streaming may be used as an alternative for traditional file-scraping approaches to help make critical operational data more quickly available for indexing, analysis, and visualization. In another example, data streaming may capture activity from websites or mobile apps, such as page views, searches, or other user actions. This information may be used for real-time monitoring and analytics, and in data warehousing systems for offline processing and reporting. In another example, data streaming may be used as a unified entry point for cloud components to report their lifecycle events for audit, accounting, and related activities.

One specific illustration of a data stream and its corresponding elements is a series of data transactions generated by clickstream data and grouped together in a collection. Examples of elements in a data stream may include webpage requests, updates to a shopping cart associated with a user account, changes to a user profile, purchases, returns, and the like. Other examples of elements in a data stream include changes to streamed sensor data, such as data transmissions associated with changes in steps taken, elevation change, location tracking coordinates, temperature, humidity, manufacturing process conditions, etc. Moreover, a data stream may include similar events tracked for successive units of time, e.g., every 10 milliseconds (ms), 100 ms, 1 second, 1 minute, etc.

Another example of elements in a data stream (that of a processing pipeline or workflow) include operations, analyses, or processes to be executed on a set of data items. Embodiments of a processing pipeline include a set of sequentially arranged algorithms that operate on corresponding elements in a set of data items. Still another example of a data stream may include events, each event being a vector representation of a data item. For example, events that are algorithms in a first data stream may operate on corresponding data item events in a second data stream, thereby producing a third data stream of vector events, where each vector event is a representation of a corresponding non-vector data item event in the first data stream.

Moreover, some data streams may be accessed and operated on by other data streams and/or computing applications to transform events within a first data stream from one object type or data type into another object type or data type. That is, data streams may be successively operated on, analyzed and/or transformed multiple times to produce a desired result data stream. In some examples, this successive processing is referred to as a "processing pipeline." In some examples, a result data stream may include vector representations of data items or transformed versions of data items (e.g., converted to an alternative data type or data representation structure). In other examples, a result data stream may include transformed data produced by the operation of one or more applications and/or algorithms (e.g., machine learning, document-to-vector, etc.) on another data stream.

Examples of an association by which a data stream may be generated include those that generate events (e.g., data transactions/updates) from a common source, a common computing application, a common webpage, a common transaction/data type, and/or a common entity (e.g., a business or organization). The associated transactions may be collectively grouped together to form a data stream. In a further example, a data stream of associated events may then be processed by one or more ML applications, thereby generating an analysis that interprets the data (e.g., via a query or real-time data trend monitoring), a result data stream, and/or a prediction.

When the size of the received data or bundles of data is small, which is common for many data types found in data streams, processes that rely on the data stream may struggle to function efficiently. One factor for this inefficiency is the constant overhead associated with processing a data bundle regardless of the data bundle size. By aggregating the data prior to generating a data stream, these inefficiencies may be reduced or eliminated, thereby increasing the throughput and performance of the various downstream services consuming this aggregated data.

FIG. 1 illustrates a system 100 in accordance with one or more embodiments. As illustrated in FIG. 1, system 100 includes a data partitioner 114 configured to receive data from one or more sources. For example, a first source may issue one or more request threads 102 (e.g., request thread 102a, request thread 102b, . . . , request thread 102n) which provide data for a first tenant. In an approach, data partitioner 114 provides the received data to a data streaming service for generation of a data stream 104. In an embodiment, data partitioner 114 may also receive data from a second source (or a different tenant at the first source). For example, the second source may issue one or more request threads 108 (e.g., request thread 108a, request thread 108b, ..., request thread 108n) for a second tenant (e.g., a different company, organization, user, etc.) which may be provided to the same or a different data streaming service for generation of a different data stream 110. In another approach, a separate data partitioner (not shown) may receive data from the second source and create partitioned data for data stream 110.

In one or more embodiments, data partitioner 114 refers to hardware and/or software configured to perform operations for partitioning received data into discrete stream partitions prior to providing the received data to a data streaming service.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, a tenant is a corporation, organization, enterprise or other entity that accesses a shared computing resource, such as system 100. In an embodiment, tenants may be independent from each other. A business or operation of one tenant is separate from a business or operation of another tenant.

Additional embodiments and/or examples relating to computer networks are described below in Section 10, titled "Computer Networks and Cloud Networks."

In one or more embodiments, a machine learning algorithm may be included in system 100 for determining one or more values of parameters affecting operation of data partitioner 114. A machine learning algorithm is an algorithm that can be iterated to learn a target model f that best maps a set of input variables to an output variable. In particular, a machine learning algorithm is configured to generate and/or train an entity-relationship (ER) model.

A machine learning algorithm may be iterated to learn a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally or alternatively, a machine learning algorithm generates a target model f such that when the target model f is applied to the datasets of the training data, a maximum number of results determined by the target model f matches the labels of the training data. Different target models be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a data repository 120 may be included in system 100. Data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as data partitioner 114 and/or the streaming service. Alternatively or additionally, a data repository 120 may be implemented or executed on a computing system separate from data partitioner 114. The data repository 120 may be communicatively coupled to data partitioner 114 via a direct connection or via a network.

3. Data Stream Partitioning

Data partitioner 114 is configured to generate data streams 104, 110 that are optimized for processing by recipient(s) of those data streams. Data partitioner 114 partitions the data for streaming in respective sections of the same stream (referred to as "stream partitions"). Using received data from request threads 102 as an example, data partitioner 114 identifies a destination for a subset of data received from the first tenant. The destination may correspond to a software and/or a hardware component that is to process and/or store the subset of data. A destination may, for example, correspond to a storage shard. Data partitioner 114 maps the destination to stream partition (e.g., stream partition 106a) of the stream 104, that has been assigned for transmissions to the particular destination. Data partitioner 114 then queues the subset of data for transmission on the stream partition 106a that is mapped to the destination for the subset of data. In one embodiment, data partitioner 114 may be distributed as multiple instances running on different computes. The requests for the same stream partition 106a may arrive at different instances of the data partitioner 114. In this instance, each instance of the data partitioner 114 will attempt to send the data to the same stream partition 106a.

Data partitioner 114 streams each stream partition with the subsets of data queued for that stream partition. Various subsets of data to be transmitted to different destinations may be transmitted in different respective stream partitions (e.g., stream partition 106b, stream partition 106c, etc.).

Prior to providing the received data to generate data stream 104, data partitioner 114 partitions the data received for the first tenant or source into a plurality of stream partitions 106 (e.g., stream partition 106a, stream partition 106b, stream partition 106c, ..., stream partition 106n). The number of stream partitions 106 does not necessarily equal the number of request threads 102 from the first tenant or source, and may be significantly less, such as by a factor of ten, one hundred, or more, e.g., a factor of $1 \times 10^4$, $1 \times 10^5$, $1 \times 10^6$, etc. For message puts into system 100, instead of basing the number of stream partitions 106 on the number of request threads 102 for the first tenant, data partitioner 114 is configured to create a number of stream partitions 106 for the first tenant that is based on data rate and/or a maximum number of log indexes possible for data stream 104, and creating a mapping between the stream partitions 106 and an associated key 116. The maximum number of log indexes for data stream 104 may be based on what type of data streaming service is employed for creating data stream 104, in an embodiment.

In another example, prior to providing the received data for the second tenant or source from request threads 108 to generate data stream 110, data partitioner 114 partitions the received data into a plurality of stream partitions 112 (e.g., stream partition 112a, stream partition 112b, . . . , stream partition 112n). The number of stream partitions 112 does not equal the number of request threads 108, and is based on a maximum number of log indexes possible for data stream 110, which may be dictated by the particular data streaming service used to generate data stream 110, among other factors. In this example, data partitioner 114 is configured to create a number of stream partitions 112 for the second tenant or source that is based on data rate and/or a maximum number of log indexes possible for data stream 110.

In an embodiment, a number of stream partitions for a particular destination may be based on a data rate at which data is being transmitted to the particular destination. System 100 may monitor a current data rate for transmissions to the particular destination and select the number of stream partitions to include in data stream 104 to ensure that the data is streamed in a timely manner (e.g., within a threshold delay, without exceeding a queue size, without resulting in a buffer overflow, etc.). System 100 may use historical data gathered over time, including patterns, tendencies, and seasonality information, to estimate the data rate for transmissions to the particular destination for data stream 104. System 100 may select the number of stream partitions 106 for the particular destination based on the estimated data rate in an embodiment.

In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

For system 100, the log set information used to determine the destination log index/storage shard may be obtained from within the request payload in an approach, or outside the request payload in an alternate approach. This log set information is retrieved to identify the log index and is placed in an appropriate streaming partition. The size of the request payload determines whether the request goes through the aggregation flow or is not provided through the aggregation flow.

There may also be some constraints placed on system 100, such as the data streaming service not supporting Idempotent production, and the data streaming service not having a managed and distributed memory store service.

In one embodiment, data partitioner 114 groups all received payload data from the first tenant based on the log sets designated by the data payloads. Each log set is mapped to a corresponding log index by the data partitioner 114 before the particular related stream partition 106 is selected for where to place the received data. In an embodiment, a partitioning key (e.g., partitioning key 116a, partitioning key 116b, . . . , partitioning key 116n) is generated by data partitioner 114 for the specific log index where the received data for the first tenant will be placed. Using a partitioning key (e.g., partitioning key 116a) ensures that the log index assigned to a specific stream partition (e.g., stream partition 106a) for a given tenant (e.g., the first tenant) remains constant until a data rate limit is reached, or over a particular timing window. In one embodiment, any particular log set is assigned to a single stream partition 106 for faster processing, and not split across multiple stream partitions.

Similarly, for the second tenant, data partitioner 114 groups all received payload data from the second tenant based on the log sets designated by the data payloads. Data partitioner 114 maps each of these log sets to a corresponding log index before the particular related stream partition 112 is selected for where to place the received data. In an embodiment, a partitioning key (e.g., partitioning key 118a, partitioning key 118b, . . . , partitioning key 118n) is generated by data partitioner 114 for the specific log index where the received data for the second tenant will be placed. In one embodiment, any particular log set is assigned to a single stream partition 112 for faster processing, and not split across multiple stream partitions.

Data partitioner 114 may generate a partitioning key using any information available that is specific to the received data, such as tenant name, receipt timestamp, log index, sequencing or ordering information, data size, source address, target address, etc. In one example, the partitioning key may be generated as a unique combination of tenant namespace, log index, and timing window. However, any unique combination of relevant information may be used to generate the partitioning keys in various approaches. Using the timing window component in the partitioning key helps to avoid hot partitions. Moreover, a hash or algorithmic conversion of a set of information may be used for partitioning keys in various approaches.

A consumer that is exclusively processing or storing data for a particular destination subscribes exclusively to stream partitions (e.g., stream partition 106a) that are assigned to that particular destination. Although only data for one destination is placed into any given stream partition in an embodiment, it is possible that data for multiple destinations/log indexes are placed into the same stream partition in other embodiments. On the consumption side, a consumer is configured to group the data from a stream partition based on the destination, process the received data, and post to each individual destination as appropriate to accommodate situations where multiple destinations/log indexes are placed into the same stream partition.

In an example, the consumer may be notified of temporary or permanent reassignment of additional stream partitions (e.g., stream partition 106b) being used for data transmissions to the particular destination. The consumer may then subscribe to the additional stream partition(s) to receive the data that is intended to be delivered to the particular destination.

4. Batching and Buffering

When using a Kafka producer, as many put requests may be sent as desired. In an embodiment, the size of each put request may be limited to about 1 Kb to about 700 Kb, such as 350 Kb, 500 Kb, 650 Kb, etc. However, any size of put request may be used in various approaches. A Kafka producer will attempt to batch records together into fewer requests whenever multiple records are being sent to the same partition. A default batch size in an embodiment is 150 KiB, but different batch sizes may be used, such as 32 KiB, 128 KiB, 256 KiB, 512 KiB, 1 MiB, 2 MiB, etc.

In another approach, the producer may group together any records that arrive in between request transmissions into a single batched request. Normally, this occurs only under load when records arrive faster than they can be sent out. This setting adds a small amount of artificial delay. In other words, rather than immediately sending out a record, the producer will wait, up to the given delay, to allow batching of multiple records/messages together. Once a size of the gathered records reaches a threshold (e.g., batch.size) for a partition, it will be sent immediately, in some approaches, regardless of this setting. However, if there are fewer than the threshold number of gathered records for this partition, the producer may wait (e.g., linger) for a specified waiting period for more records to show up. The waiting period may be set or automatically chosen based on observed behavior of the producer, and may have values like 5 ms, 10 ms, 20 ms, 30 ms, etc. A machine learning algorithm may be used to set the waiting period value in an embodiment. The longer the waiting period is, the more latency will be added to the response time unless the threshold is reached consistently.

A total number of bytes of memory the producer can use to buffer records waiting to be sent to the server is referred to as the buffer memory (e.g., buffer.memory). The size of the buffer memory may be set or automatically chosen based on observed behavior of the producer, and may have values like 16 MiB, 32 MiB, 48 MiB, 64 MiB, 72 MiB, etc. A machine learning algorithm may be used to set the buffer memory size in an embodiment. Also, if requests are sent faster than they can be transmitted to the server, then the buffer memory may become exhausted. In cases where the buffer memory is exhausted, additional send calls will be blocked.

5. Handling Idempotency

Some streaming services do not support Idempotent producers. If a producer receives an acknowledgment (ack) from a broker and acks=all, it implies that the message has been written exactly once to the topic. However, if a producer ack times out or receives an error, it might retry sending the message assuming that the message was not written to the topic. If the broker has failed right before it sends the ack but after the message was successfully written to the topic, this retry leads to the message being written twice and hence delivered more than once to the end consumer. To avoid this type of possible data duplication, a retries producer configuration may be set to zero. This ensures that a retry is not attempted on a producer send failure and respond to the client with an error (e.g., an Internal Server Error).

The client would be expected to retry the request in this case. However, in spite of setting retries to zero, it is possible that the request has arrived at the broker (e.g., Kafka broker). There is not a method of verifying if this situation has occurred. To handle such transient possible producer errors (e.g., Kafka errors), a custom retry mechanism may be implemented. For example, if a Kafka send fails, the send on the same Kafka partition is attempted. This technique helps to eliminate duplicate data on the consumer side. Every Kafka send may be tagged with a unique ID. As these messages are processed in the consumer, the set of message IDs are persisted in distributed cache for a configurable time period. The time period may be set or automatically chosen based on observed behavior of the system, and may have values like 2 min, 5 min, 10 min, 15 min, 20 min, etc. A machine learning algorithm may be used to set the time period value in an embodiment. If a message with the same unique ID is detected in the consumer, it would be eliminated to avoid duplicated data.

Besides ensuring that Kafka send calls are Idempotent, the application programming interface (API) used to access the system should also be configured to be Idempotent. If the user fails to receive a successful API response for some reason (network failure, etc.), the API would be retried. By making use of a custom retry-token concept, the API is made to be Idempotent.

In an example, binary data is accepted and the data type may be JavaScript Object Notation (JSON), an archive file format like ZIP, GZIP, etc. In the cases of JSON and GZIP data types, log set information is available in the query parameter. In the case of a ZIP payload, multiple files may be stored within the ZIP file. Therefore, log set information would be determined from each file individually, such as in the case of a set of JSON files within a ZIP. In this case, log set information is part of the JSON file name and may vary from one file to the next. That means that the files inside a ZIP may map to different log indexes and thus be for different stream partitions. To provide Idempotency support, for every JSON (individually, or as part of a ZIP file) and GZ file, the request which submitted the file is tracked.

6. Data Ingestion

Figure 2:
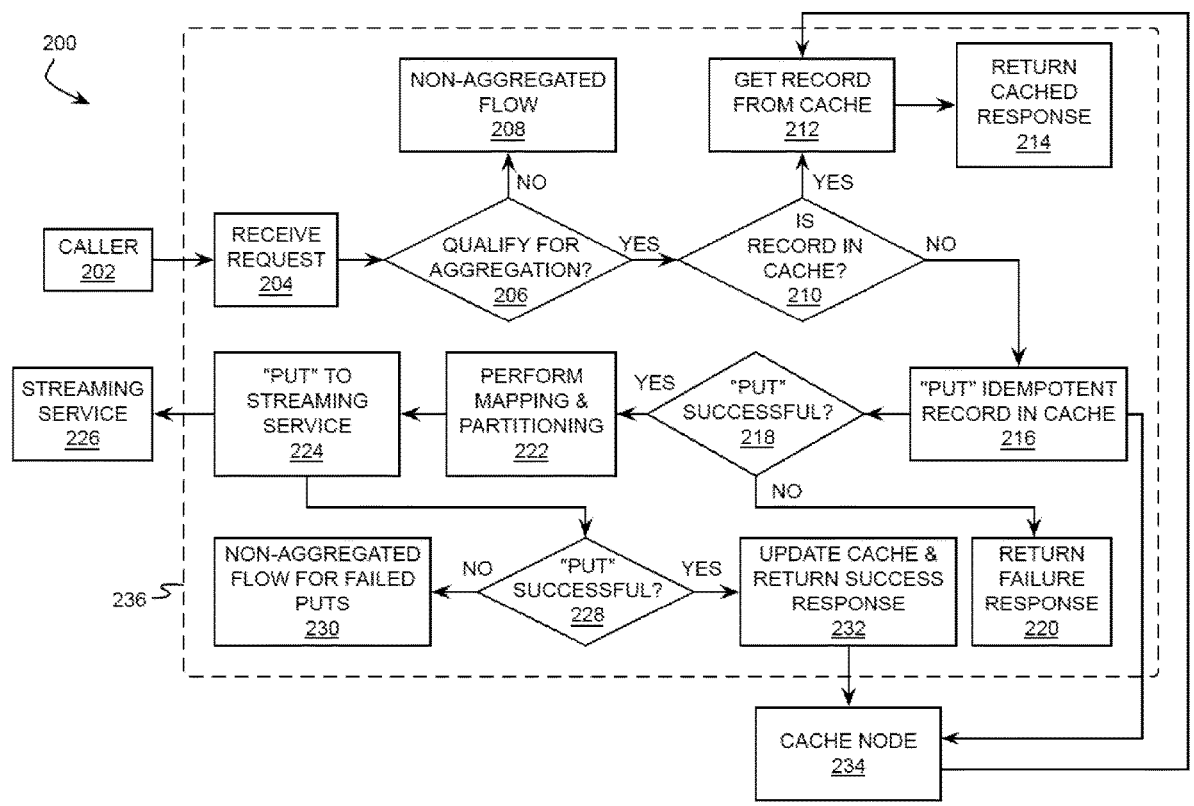
FIG. 2 illustrates a data stream generation workflow in accordance with one or more embodiments.

FIG. 2 illustrates a data ingestion workflow 200 in accordance with one or more embodiments. Workflow 200 shows a single request processing thread 234 within a single data ingest instance. There may be multiple request processing threads operating within any given data ingest instance, and there may be multiple data ingest instances operating at any one time. When a caller invokes a data ingest operation in Operation 202, the request is received in Operation 204 by one of the data ingest service instances. The data ingest service instances may be accessed through a gateway that receives all the requests and passes the requests to the correct service.

The request is reviewed to determine if it qualifies for aggregation in Operation 206. In one embodiment, some or all of the following checks may be performed to determine if the request qualifies for aggregation: 1) tenancy is log index enabled, 2) request payload is less than 1 MiB, 3) log set is present. In this embodiment, if any of these conditions are not satisfied, the request will not qualify for aggregation. If the request does not qualify for aggregation, the request is handled using a non-aggregated flow in Operation 208— e.g., the payload is uploaded to a cloud, distributed, or remote storage system, such as Object Storage, and a message is written to the chosen streaming service 226. When the request qualifies for aggregation, a check is made to determine if an Idempotent record exists in distributed cache in Operation 210, such as by accessing and/or sending a message to a cache node 234. When the Idempotent record exists in distributed cache, the record is retrieved from the distributed cache in Operation 212. Once the record is retrieved from distributed cache, the cached response is returned in Operation 214.

In response to the record not existing in distributed cache, an Idempotent record is written in distributed cache (e.g., a "put" call) in Operation 216, e.g., by accessing or sending a message to the cache node 234 for access to distributed cache. When the put operation to distributed cache is determined to be unsuccessful in Operation 218, an appropriate failure response is returned in Operation 220 to the caller from Operation 202.

In response to the put operation to distributed cache being determined to be successful in Operation 218, several processes may be performed in Operation 222, including mapping a log set corresponding to the written record to an appropriate log index, and partitioning of the record using any of the techniques described herein in various embodiments. Operation 222 also includes generation of a partition key for the partition, which may be based on a combination of tenancy namespace, log index, and a timing window. This partition key may be used later for partition determination when searching for data.

Once partitioning and mapping is complete in Operation 222, the record is pushed (e.g., "put" call) in Operation 224 to a selected streaming service 226 for generating a stream with partitioned data therein. Operation 224 may be performed asynchronously, in batches, and/or with compressed data for conservation of resources. In an embodiment, one or more APIs compatible with the chosen streaming service 226 may be used to send the data to the streaming service 226.

In an embodiment that utilizes a Kafka producer, the payload may be sent to the streaming service 226 using Kafka compatible APIs (e.g., Kafka producer's asynchronous send call). The asynchronous send queues up the payload in the output buffers of the Kafka producer. The buffers are offloaded to the streaming service 226 when a batch size exceeds the set threshold, or when the linger waiting period expires, whichever occurs first. The Kafka producer's batching helps to reduce the number of "put" calls to the streaming service 226, to avoid situations where data throughput to the streaming service 226 is throttled. The streaming service may throttle based on the number of put calls per second exceeding a threshold, in one approach.

In Operation 228, it is determined whether the put operation was successful. A period of time may be waited prior to performing this check, in an approach. A timeout may be associated with the waiting period, that when reached triggers an unsuccessful determination.

When the put operation to the streaming service is determined to be successful in Operation 228, distributed cache is updated in Operation 232 and a success response is returned to the caller from Operation 202. When the put operation to the streaming service is determined to be unsuccessful in Operation 228, the payload is processed using a non-aggregated flow in Operation 230.

Distributed cache provided by the cache node 234 is accessed during the retrieval operation of Operation 210, the put operation of Operation 216, and for updating the distributed cache in Operation 232. In general, distributed cache is maintained at all times for quick turnaround times.

7. Data Consumption

Figure 3:
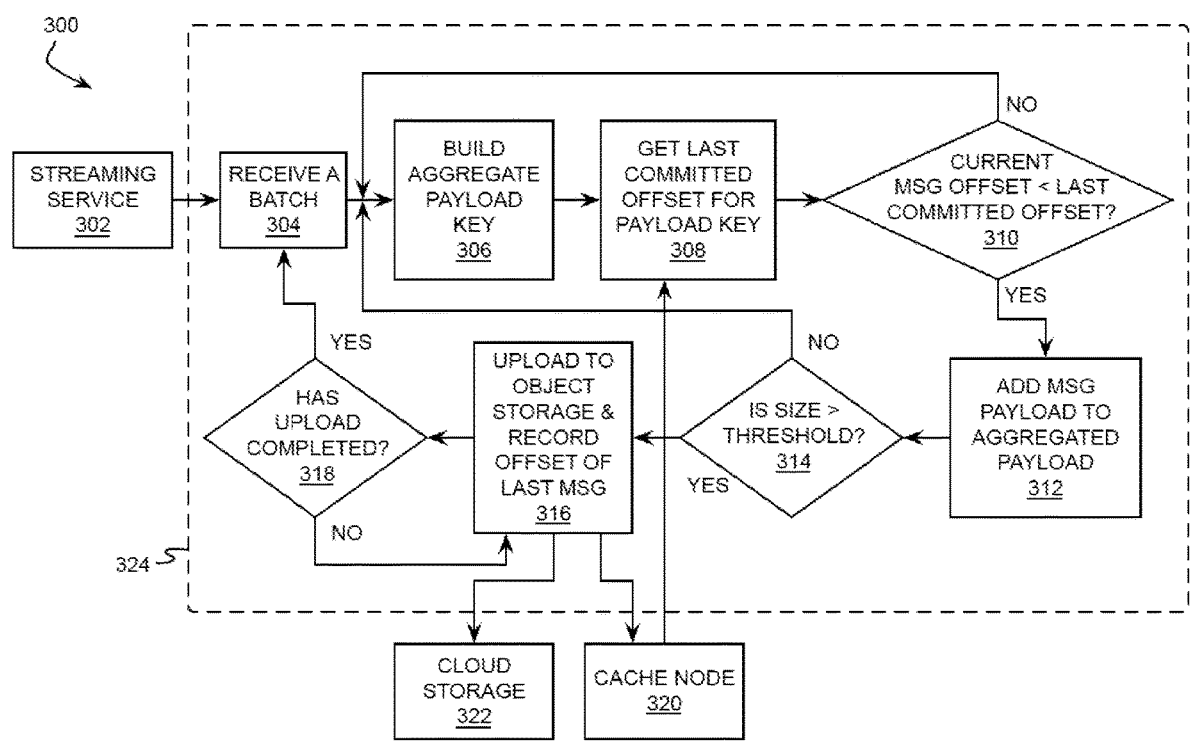
FIG. 3 illustrates a data consumption workflow in accordance with one or more embodiments.

FIG. 3 illustrates a data ingest consumer workflow 300 in accordance with one or more embodiments. Workflow 300 shows a single consumer thread 324 within a single data ingest instance. There may be multiple consumer threads operating within any given data ingest instance, and there may be multiple data ingest instances operating at any one time.

Workflow 300 starts by receiving or polling a streaming service in Operation 302 to receive a batch of data in Operation 304. Based on the batch of data, and for each record in the batch of data, the consumer builds or generates an aggregate payload key in Operation 306 (based on some information specific to the payloads). In one embodiment, the aggregate payload key may be based on the tenancy namespace, log index, log group ID, and partition detail. Once the aggregate payload key is built, a last committed message offset for the aggregate payload key is determined in Operation 308, such as by pulling the value from the cache node 320 where such information is recorded. When no value for the last committed message offset exists in the cache node 320, then it may be assumed that this is the first message added to the payload. The consumer determines whether a current message offset is less than the last committed message offset in Operation 310. Responsive to the current message offset being less than the last committed message offset, it implies that the current message is a duplicate message. This message is ignored and the next message from the batch is retrieved to continue building the aggregate payload key in Operation 306. Responsive to the current message offset exceeding the last committed message offset, the message payload is added to an aggregated payload being built in Operation 312.

Once the upload size reaches or exceeds a threshold upload size as determined in Operation 314, the aggregated payload is uploaded to cloud storage 322 in Operation 316. Cloud storage 322 may be any type of distributed, cloud, or remote storage system, such as Object Storage which is a scalable, fully programmable, and durable cloud storage service.

Furthermore, the offset of the last message is recorded in the cache node 320. Should the upload size not meet a threshold upload size, as determined in Operation 314, additional message(s) will be added to the payload. The consumer waits for the upload to complete in Operation 318. Once it is complete, another batch may be received and processed.

In other words, if aggregated data is available for the aggregate payload key being built in Operation 306, the size of the aggregated data is checked against the maximum allowed upload size. If it is smaller than the maximum upload size, objects are allocated for the aggregation payload key being built in Operation 306, additional payloads from different messages may be added to the aggregated payload in an approach, and the aggregate payload key is updated. Once the size of the current message payload and the already aggregated payload is greater than or equal to the maximum allowed, the already aggregated payload is stored to cloud storage 322. This may be performed by submitting the aggregated payload to an executor service for upload to the cloud storage 322, other messages in the batch are processed and used to create a new aggregated payload.

If any unprocessed messages (e.g., due to not meeting the processing criterion) are still available from the batch, they are submitted for upload to the cloud storage 322. For every successful upload to the cloud storage 322, the distributed cache in the cache node 320 is updated with the details of the message key and the offset of the last message that was added to the aggregated payload. If the call to cloud storage 322 fails, the distributed cache is not updated. Those messages will be re-delivered in the next processing cycle. Once results (success or failure) are available, the consumer returns the call. At this point, the message offsets may be committed to distributed cache.

In one or more embodiments, Kafka consumers may be operated to consume the ingested data (in the form of records/messages) in Operation 304, build an aggregated payload in Operations 306, 308, 310, and 312, and upload the aggregated payload to Object Storage in Operation 316. However, any type of consumer may be used in various approaches. In one embodiment, the number of consumers is equal to the number of stream partitions, so that every consumer subscribes to one stream partition. However, less consumers may be used in various approaches. According to one embodiment, each stream partition may include data for a single log index, but multiple tenant namespaces may be possible over a given timing window. In another embodiment, each stream partition may include data from multiple log indexes. The log indexes information is available from the aggregated payload key which is used by the consumer for grouping the payloads.

The amount of data that is received in every run of the consumer should be maximized. In order to implement this, some configuration on the consumer may be performed.

One such configuration relates to getting sufficient data. For a Kafka consumer, parameter fetch.max.bytes is the maximum amount of data a server will return for a fetch request. This parameter may be set or automatically chosen based on observed behavior of the consumer, and may have values like 15 MiB, 25 MiB, 50 MiB, 60 MiB, 75 MiB, etc. A machine learning algorithm may be used to set the value for fetch.max.bytes in an embodiment. Similarly, for a Kafka consumer, parameter fetch.min.bytes is the minimum amount of data the server will return for a fetch request. If insufficient data is available, the request will wait for that much data to accumulate. This parameter may be set or automatically chosen based on observed behavior of the consumer, and may have values like 1 byte, 2 bytes, 5 bytes, 100 bytes, 1 MiB, 5 MiB, 10 MiB, etc. A machine learning algorithm may be used to set the value for fetch.min.bytes in an embodiment. In one embodiment, fetch.min.bytes may be set based on an algorithm: fetch.min.bytes$\geq$1.5 MiB*x, where x is the numbers of stream partitions per consumer. In this embodiment, if 50 partitions are assigned to 15 consumer threads, the fetch.min.bytes equals about 6 MiB. Similar parameters may exist for other consumer types, and may be set in accordance with the embodiments described above.

Another parameter related to getting sufficient data is fetch.max.wait.ms for a Kafka consumer, which is a maximum amount of time the server will block before answering the fetch request when sufficient data to immediately satisfy the requirement given by fetch.min.bytes is not available. Given that the maximum read throughput supported by some streaming services is 2MiB/sec/partition, a value of at least 1 second may be selected. However, this parameter may be set or automatically chosen based on observed behavior of the consumer, and may have values like 500 ms, 750 ms, 1 second, 1.5 seconds, 2 seconds, etc. A machine learning algorithm may be used to set the value for fetch.max.wait.ms in an embodiment. Similar parameters may exist for other consumer types, and may be set in accordance with the embodiments described above.

For a Kafka consumer, parameter receive.buffer.bytes is the size of the TCP receive buffer that is employed when reading data. This parameter may be set or automatically chosen based on observed behavior of the consumer, and may have values like 16 KiB, 32 KiB, 128 KiB, 1 MiB, 2 MiB, 10 MiB, 16 MiB, 32 MiB, etc. A machine learning algorithm may be used to set the value for receive.buffer.bytes in an embodiment.

If the aggregated data does not cross the desired maximum size threshold even after running through the events batch, the amount of data aggregated would be sent off to cloud storage. In one approach, a state is not maintained as the system moves from one processing cycle to the next.

In one embodiment, offsets may be maintained to ensure exactly once processing. For example, as the messages/records are processed, aggregated payloads for upload to cloud storage will be produced. A pool of threads may be available which would handle uploads of aggregated data to cloud storage. Once an aggregated data payload is successfully uploaded, the last committed offset is written in a distributed cache, such as Coherence/Redis cache.

With a consumer having Kafka auto-manage group membership, a partition re-assignment will be triggered any time the members of the group change or the subscription of the members changes. This can occur when consumers die, new consumer instances are added, or old instances come back to life after failure. Partition re-assignments can also be triggered by changes affecting the subscribed topics (e.g., when the number of partitions is adjusted).

Under these circumstances, the Kafka would gracefully rebalance the partitions among the consumers. This rebalancing happens as part of the poll call. Besides this functionality, there may be cases whereby the consumer does not get an opportunity to give up ownership of its partition(s) gracefully. For this, the consumer sends periodic heartbeats to the server. If the consumer crashes or is unable to send heartbeats for a certain duration, referred to as session.timeout.ms, then the consumer will be considered dead and its partitions will be reassigned. This duration parameter may be set or automatically chosen based on observed behavior of the consumer, and may have values like 10 seconds, 15 seconds, 20 seconds, 30 seconds, 60 seconds, etc. A machine learning algorithm may be used to set the value for session.timeout.ms in an embodiment.

8. Maintaining State with Distributed Cache

The cache node that is used to store last message offset and keys, among other information, may be a distributed cache accessible to the entire system or to the specific components which need to write to and retrieve data from the cache. One such distributed cache is Coherence/Redis cache, which is a clustered, fault-tolerant cache that has linear scalability. Data is partitioned among all storage members of the cluster. For fault tolerance, Coherence/Redis cache may be configured to replicate data across one or more nodes of the cluster. In an embodiment, Coherence/Redis cache may be used to keep a record of Idempotent operations (on the producer side) and details of the committed offsets on the consumer side. Expected cache performance, with gigabit ethernet, read performance, would be sub-millisecond. Write performance is also extremely fast.

9. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 4:
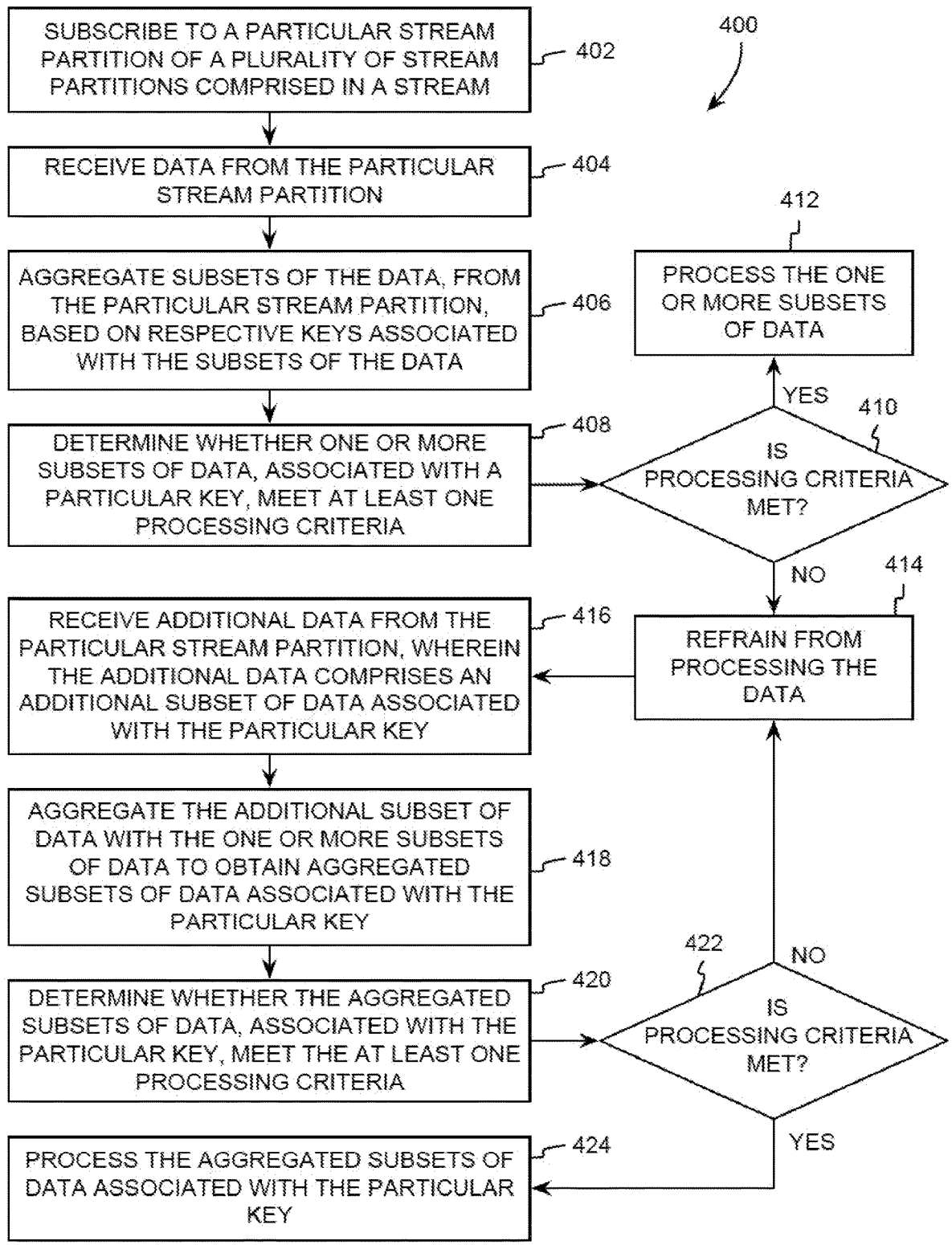
FIG. 4 illustrates an example set of operations for aggregating data, in accordance with one or more embodiments.

FIG. 4 illustrates an example set of operations 400 for aggregating data from a data stream, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. In the context of FIG. 4, the set of operations 400 will be described as being performed by a computing device that implements one or more data ingest service instances. Although the operations are described in as being executed by a computing device, any hardware, software, or combination thereof may be used to execute the set of operations 400 in one or more embodiments.

A computing device, such as a data aggregator, for executing the set of operations 400 may include certain configurations or settings. These settings may be adjusted manually or as part of a machine learning update routine. These settings include, but are not limited to, the number of partitions in a data stream, the number of data aggregators, the read throughout per partition, etc. For example, for a stream of X partitions and Y data aggregators, each data aggregator would be handling X/Y partitions, limited by the read throughout per partition per second. If X/Y is not a whole number (e.g., X>Y), a few data aggregators would end up processing from more than one partition.

The computing device subscribes to a particular stream partition of a plurality of stream partitions that are within a data stream in Operation 402. Any number of stream partitions may be included in the data stream. In one or more embodiments, a number of stream partitions for each destination may be calculated and/or determined based on a data rate at which data is being transmitted to each destination. Moreover, each stream partition may include data that is associated with various keys.

The computing device receives data from the particular stream partition in Operation 404. In other words, the data that is included in the particular stream partition to which the computing device is subscribed is delivered to the computing device via the data stream. More and more data is received by the computing device over time, based on the data throughput, size of data packets, transmission rate for the data stream, etc.

In Operation 406, the computing device aggregates and/or gathers subsets of the data, from the particular stream partition. The way in which the subsets of data are aggregated may be based on one or more factors. One example factor may be respective keys that are associated with the subsets of the data when they are placed in the data stream, which may be ascertained from the subsets of data upon receiving the data of the particular stream partition at the computing device.

The computing device determines whether one or more subsets of data, associated with a particular key, meet at least one processing criteria in Operation 408. In one embodiment, a processing criterion may specify a threshold amount of data that is to be batched prior to processing any of the gathered data, e.g., a batch data threshold. When the batch data threshold is achieved in the gathered data, then the gathered data may be processed; otherwise, the computing device waits for more data to be batched in method 400 prior to processing the data. Any suitable batch data threshold may implemented, and may be generated and/or optimized using a machine learning engine. Moreover, a default batch data threshold may initially be used, and may be dynamically adjusted based on feedback from downstream processor activities that utilize the data from the data stream. Some example batch data thresholds include, but are not limited to, 0.5 MB, 0.75 MB, 1.0 MB, 1.5 MB, 2.0 MB, 3.0 MB, etc.

In one or more embodiments, the processing criteria may include a maximum time delay. When data associated with a specific key has been gathered for more than a threshold amount of time, then the gathered data, regardless of the size of the gathered data, may be processed to ensure that data is not delayed for more than the threshold amount of time. If the threshold amount of time is not exceeded, then the computing device may wait for additional data to arrive in the stream partition that is associated with the specific key.

Any suitable time delay may implemented, and may be generated and/or optimized using a machine learning engine. Moreover, a default time delay may initially be used, which may be dynamically adjusted based on feedback from downstream processor activities that utilize the data from the data stream. Some example time delays include, but are not limited to, 0.05 seconds, 0.1 seconds, 0.2 seconds, 0.5 seconds, 1 second, etc.

If the processing criteria is met in Operation 410 (for example, the size of data in one or more subsets of data exceeds the batch data threshold), the computing device processes the data in Operation 412. Thereafter, the computing device may again begin accumulating and batching data associated with the particular key that is received from the stream partition.

Responsive to determining that one or more subsets of data, associated with the particular key, do not meet the threshold amount of data specified in the processing criteria in Operation 410, the computing device refrains from processing one or more subsets of data in Operation 414. Thereafter, the computing device continues to Operation 416 to acquire more data, at least until a size of the gathered data exceeds the batch data threshold and other processing criteria.

In Operation 416, the computing device receives additional data from the particular stream partition. In an embodiment, the additional data includes an additional subset of data associated with the particular key. Data that is associated with a common key should be provided to the same destination. Therefore, the additional data associated with the particular key may be aggregated together with the one or more subsets of data associated with the particular key that have already been accumulated.

Accumulated data for each individual key may be stored in a cache or some other fast access memory structure, for quick storage and retrieval. Moreover, each set of accumulated data may be stored separately or in different storage constructs, such as files, folders, etc.

The computing device aggregates the additional subset of data, associated with the particular key, with one or more subsets of data associated with the particular key in Operation 418. In this way, all data that is associated with a particular key is accumulated together, thereby reducing processing overheads and improving the performance of processing and/or delivery to the intended storage destination.

In Operation 420, subsequent to aggregating the additional subset of data with one or more subsets of data associated with the particular key, the computing device determines whether the aggregated subsets of data, associated with the particular key, meet the processing criteria. The processing criteria may include the batch data threshold for releasing the aggregated subsets of data for processing.

If the processing criteria is met in Operation 422 (for example, the size of data in the aggregated subsets of data exceeds the batch data threshold, a data holding time threshold being exceeded), the computing device processes the data in Operation 424 to process the aggregated subsets of data associated with the particular key. The data holding time is the amount of time that oldest data from the particular stream partition has been batched with other subsets of data. Thereafter, method 400 returns to Operation 404 to receive additional data for the particular key to be accumulated from the data stream in another batch, in some approaches.

Responsive to determining that the aggregated subsets of data, associated with the particular key, do not meet the threshold amount of data specified in the processing criteria in Operation 422, the computing device refrains from processing the aggregated subsets of data in Operation 414, at least until a size of the gathered data exceeds the batch data threshold and/or the data holding time threshold is exceeded. Thereafter, the computing device continues to Operation 416 to acquire more data.

Processing data may include any action that manipulates, changes, modifies, moves, analyzes, and/or uses the data in some way. For example, processing data may include, in one or more embodiments, storing, transmitting, sending, deleting, validating, encrypting, decrypting, encoding, decoding, searching, duplicating, etc. Moreover, in some approaches, multiple processing cycles may be performed on the data once the processing criteria is satisfied.

In one embodiment, processing one or more subsets of data includes sending one or more subsets of data, associated with the particular key, to a destination associated with the particular key. In one approach, processing the aggregated subsets of data includes sending the aggregated subsets of data, associated with the particular key, to the destination associated with the particular key.

In one embodiment, a single tenant may be associated with a plurality of keys. In this embodiment, each key corresponds to different datasets for the single tenant. The tenant, in various examples, may be a company, business, corporation, organization, school, user, client, or any portion or grouping thereof. Moreover, new keys may be associated with any particular tenant to denote new groupings of data within the data stream and partitions thereof.

In an embodiment, method 400 may include the computing device aggregating one or more different subsets of data received from the particular stream that are associated with a second key that is different from the particular key associated with the subsets of data previously aggregated. Subsequent to aggregating one or more subsets of data associated with the second key, the computing device determines whether the subsets of data, associated with the second key, meet the processing criteria (which may be the same processing criteria used for the subsets of data previously aggregated or different processing criteria). In some embodiments, the batch data threshold may be individually selected for each different key, e.g., the batch data threshold for the second key is different than the batch data threshold for the first key. Responsive to determining that the subsets of data, associated with the second key, meet the processing criteria, the computing device processes subsets of data associated with the second key.

In one embodiment, method 400 may include the computing device receiving second data from a second stream partition and a third stream partition. Once this data from other stream partitions is received, the computing device may aggregate subsets of the second data, from the second stream partition and the third stream partition, based on respective keys associated with the subsets of the second data. In other words, subsets of data from multiple stream partitions may be aggregated based on respective keys associated with the data in the subsets of data.

In an embodiment, the computing device receives additional second data from the second stream partition and the third stream partition. The additional second data includes an additional subset of second data associated with the particular key. In response to the additional subset of second data being associated with the particular key, the computing device aggregates the additional subset of second data, associated with the particular key, with one or more subsets of second data associated with the particular key.

In this way, aggregated groups of data for each of a plurality of different keys may be accumulated simultaneously until processing criteria is satisfied, and then processed to achieve higher efficiency and resource usage in processing the data in the data stream and stream partitions thereof.

In one or more embodiments, the computing device and/or a machine learning engine may receive feedback from one or more downstream processor activities subsequent to the one or more subsets of data associated with the particular key being processed. The machine learning engine analyze this feedback and adjust and/or optimize one or more of the processing criteria based on the analyzed feedback.

In one example, the threshold amount of data may be based on the feedback from one or more downstream processor activities, and may be adjusted to be larger or smaller in size based on the feedback.

In another example, the maximum time delay may be based on the feedback from the one or more downstream processor activities, and may be adjusted to be longer or shorter in time based on the feedback.

In one or more embodiments, when a specific system processes the data from the particular stream partition, the computing device or some other device or process may perform one or more tests to help determine optimum and/or improved processing criteria. In an example, the threshold amount of data may based on results from the one or more tests. In another example, the maximum time delay may be based on results from the one or more tests.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

12. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    subscribing to a particular stream partition of a plurality of stream partitions comprised in a stream;
    receiving data from the particular stream partition;
    aggregating subsets of the data, from the particular stream partition, based on respective keys associated with the subsets of the data;
    determining whether one or more of the subsets of data, associated with a particular key, meet at least one processing criteria, wherein the at least one processing criteria specifies a threshold amount of data;
    responsive at least to determining that the one or more of the subsets of data, associated with the particular key, do not meet the threshold amount of data specified in the processing criteria, refraining from processing the one or more of the subsets of data;
    receiving additional data from the particular stream partition, wherein the additional data comprises an additional data subset associated with the particular key;
    aggregating the additional data subset, associated with the particular key, with the one or more of the subsets of data associated with the particular key to obtain updated aggregated data subsets associated with the particular key;
    subsequent to aggregating the additional data subset with the one or more of the subsets of data associated with the particular key: determining whether the updated aggregated data subsets, associated with the particular key, meet the at least one processing criteria; and
    responsive at least to determining that the updated aggregated data subsets, associated with the particular key, meet the at least one processing criteria: processing the updated aggregated data subsets associated with the particular key.

2. The non-transitory computer readable medium as recited in claim 1, wherein a single tenant is associated with a plurality of keys, each key corresponding to different datasets for the tenant.

3. The non-transitory computer readable medium as recited in claim 1, wherein the operations further comprise:
    receiving feedback from one or more downstream processor activities subsequent to processing the one or more of the subsets of data associated with the particular key, wherein the threshold amount of data is based on the feedback.

4. The non-transitory computer readable medium as recited in claim 1, wherein the operations further comprise:
    performing one or more tests in a specific system that processes the data from the particular stream partition, wherein the threshold amount of data is based on the one or more tests.

5. The non-transitory computer readable medium as recited in claim 1, wherein the operations further comprise:
    sending the one or more of the subsets of data, associated with the particular key, to a destination associated with the particular key.

6. The non-transitory computer readable medium as recited in claim 1, wherein the operations further comprise:
    aggregating one or more second subsets of data, associated with a second key, received from the particular stream partition;
    subsequent to aggregating the one or more second subsets of data associated with the second key: determining whether the one or more second subsets of data, associated with the second key, meet the processing criteria; and responsive at least to determining that the one or more second subsets of data, associated with the second key, meet the processing criteria: processing the one or more second subsets of data associated with the second key.

7. The non-transitory computer readable medium as recited in claim 1, wherein the particular key is based on at least one of: a tenant namespace, and a log index.

8. The non-transitory computer readable medium as recited in claim 1, wherein the operations further comprise:
receiving second data from a second stream partition and a third stream partition; and
aggregating subsets of the second data, from the second stream partition and the third stream partition, based on respective keys associated with the subsets of the second data.

9. The non-transitory computer readable medium as recited in claim 8, wherein the operations further comprise:
receiving additional second data from the second stream partition and the third stream partition, wherein the additional second data comprises an additional subset of second data associated with the particular key; and
aggregating the additional subset of second data, associated with the particular key, with the one or more subsets of second data associated with the particular key.

10. A method comprising:
subscribing to a particular stream partition of a plurality of stream partitions comprised in a stream;
receiving data from the particular stream partition;
aggregating subsets of the data, from the particular stream partition, based on respective keys associated with the subsets of the data;
determining whether one or more of the subsets of data, associated with a particular key, meet at least one processing criteria, wherein the at least one processing criteria specifies a threshold amount of data;
responsive at least to determining that the one or more of the subsets of data, associated with the particular key, do not meet the threshold amount of data specified in the processing criteria, refraining from processing the one or more of the subsets of data;
receiving additional data from the particular stream partition, wherein the additional data comprises an additional data subset associated with the particular key;
aggregating the additional data subset, associated with the particular key, with the one or more of the subsets of data associated with the particular key to obtain updated aggregated data subsets associated with the particular key;
subsequent to aggregating the additional data subset with the one or more of the subsets of data associated with the particular key: determining whether the updated aggregated data subsets, associated with the particular key, meet the at least one processing criteria; and
responsive at least to determining that the updated aggregated data subsets, associated with the particular key, meet the at least one processing criteria: processing the updated aggregated data subsets associated with the particular key.

11. The method as recited in claim 10, wherein a single tenant is associated with a plurality of keys, each key corresponding to different datasets for the tenant.

12. The method as recited in claim 10, further comprising:
receiving feedback from one or more downstream processor activities subsequent to processing the one or more of the subsets of data associated with the particular key, wherein the threshold amount of data is based on the feedback.

13. The method as recited in claim 10, further comprising:
performing one or more tests in a specific system that processes the data from the particular stream partition, wherein the threshold amount of data is based on the one or more tests.

14. The method as recited in claim 10, further comprising:
sending the one or more of the subsets of data, associated with the particular key, to a destination associated with the particular key.

15. The method as recited in claim 10, further comprising:
aggregating one or more second subsets of data, associated with a second key, received from the particular stream partition;
subsequent to aggregating the one or more second subsets of data associated with the second key: determining whether the one or more second subsets of data, associated with the second key, meet the processing criteria; and
responsive at least to determining that the one or more second subsets of data, associated with the second key, meet the processing criteria: processing the one or more second subsets of data associated with the second key.

16. The method as recited in claim 10, wherein the particular key is based on at least one of: a tenant namespace, and a log index.

17. The method as recited in claim 10, further comprising:
receiving second data from a second stream partition and a third stream partition; and
aggregating subsets of the second data, from the second stream partition and the third stream partition, based on respective keys associated with the subsets of the second data.

18. The method as recited in claim 17, further comprising:
receiving additional second data from the second stream partition and the third stream partition, wherein the additional second data comprises an additional subset of second data associated with the particular key; and
aggregating the additional subset of second data, associated with the particular key, with the one or more subsets of second data associated with the particular key.

19. A system, comprising:
one or more hardware processors; and
a non-transitory computer readable medium comprising instructions which, when executed by the one or more hardware processors, causes performance of operations comprising:
subscribing to a particular stream partition of a plurality of stream partitions comprised in a stream;
receiving data from the particular stream partition;
aggregating subsets of the data, from the particular stream partition, based on respective keys associated with the subsets of the data;
determining whether one or more of the subsets of data, associated with a particular key, meet at least one processing criteria, wherein the at least one processing criteria specifies a threshold amount of data;
responsive at least to determining that the one or more of the subsets of data, associated with the particular key, do not meet the threshold amount of data specified in the processing criteria, refraining from processing the one or more of the subsets of data;

receiving additional data from the particular stream partition, wherein the additional data comprises an additional data subset associated with the particular key;

aggregating the additional data subset, associated with the particular key, with the one or more of the subsets of data associated with the particular key to obtain updated aggregated data subsets associated with the particular key;

subsequent to aggregating the additional data subset with the one or more of the subsets of data associated with the particular key: determining whether the updated aggregated data subsets, associated with the particular key, meet the at least one processing criteria; and responsive at least to determining that the updated aggregated data subsets, associated with the particular key, meet the at least one processing criteria: processing the updated aggregated data subsets associated with the particular key.

20. The system as recited in claim 19, wherein the operations further comprise:

receiving feedback from one or more downstream processor activities subsequent to processing the one or more of the subsets of data associated with the particular key, wherein the threshold amount of data is based on the feedback.

* * * * *